United States Patent
Roessler

(10) Patent No.: US 8,641,285 B2
(45) Date of Patent: Feb. 4, 2014

(54) SLIDING BEARING, PROCESS FOR PRODUCING A SLIDING BEARING AND USE OF A SLIDING BEARING

(75) Inventor: Uwe Roessler, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 13/267,993

(22) Filed: Oct. 7, 2011

(65) Prior Publication Data

US 2012/0087608 A1    Apr. 12, 2012

(30) Foreign Application Priority Data

Oct. 7, 2010  (DE) .......................... 10 2010 042 118

(51) Int. Cl.
 *F16C 27/02*    (2006.01)
 *F16C 33/02*    (2006.01)
 *F16C 33/74*    (2006.01)

(52) U.S. Cl.
 USPC ............ 384/215; 384/152; 384/283; 384/296

(58) Field of Classification Search
 USPC ......... 384/129, 152, 192, 215, 220, 276, 280, 384/282–283, 296
 See application file for complete search history.

(56) References Cited

U.S. PATENT DOCUMENTS

| | | | | |
|---|---|---|---|---|
| 2,702,730 A * | 2/1955 | Ivanoff et al. | ............ | 29/898.055 |
| 3,510,814 A * | 5/1970 | Nordfors | ........................ | 335/262 |
| 4,677,410 A * | 6/1987 | Gibas | ............................ | 335/262 |
| 5,102,239 A * | 4/1992 | Momose et al. | .............. | 384/276 |
| 5,209,577 A * | 5/1993 | Swatek | ....................... | 384/97 |
| 6,062,098 A * | 5/2000 | Spalthoff | .................... | 74/473.34 |
| 6,218,922 B1 * | 4/2001 | Clark et al. | .................... | 335/262 |
| 7,220,056 B2 * | 5/2007 | Kubota et al. | ................. | 384/276 |
| 7,658,545 B2 * | 2/2010 | Dubreuil et al. | .............. | 384/192 |
| 7,665,747 B2 * | 2/2010 | Arlt | ................................ | 384/296 |
| 2002/0090154 A1 * | 7/2002 | Murray | ........................ | 384/192 |
| 2005/0002591 A1 * | 1/2005 | Buitmann | ....................... | 384/35 |
| 2010/0239199 A1 * | 9/2010 | Nakagawa | .................... | 384/283 |

FOREIGN PATENT DOCUMENTS

| | | | |
|---|---|---|---|
| DE | 2819396 A | * | 11/1979 |
| EP | 1394426 A2 | * | 3/2004 |
| JP | 2003042141 A | * | 2/2003 |
| JP | 200740429 A | * | 2/2007 |
| JP | 2007083790 A | * | 4/2007 |
| JP | 2008151289 A | * | 7/2008 |
| JP | 2008215576 A | * | 9/2008 |

* cited by examiner

*Primary Examiner* — Marcus Charles
(74) *Attorney, Agent, or Firm* — Michael Best & Friedrich LLP

(57) ABSTRACT

A sliding bearing (10) having a bearing body (11) which receives a shaft (1) in a guide bore (26) and is fabricated by a noncutting production process, wherein the bearing body (11) serves for at least indirect arrangement in a preferably fixedly arranged element (2), in particular a housing. According to the invention, it is provided that the bearing body (11) is provided on its outer circumference with a receptacle (14) for an elastic bearing element (12) for bearing against the fixed element (2).

16 Claims, 3 Drawing Sheets

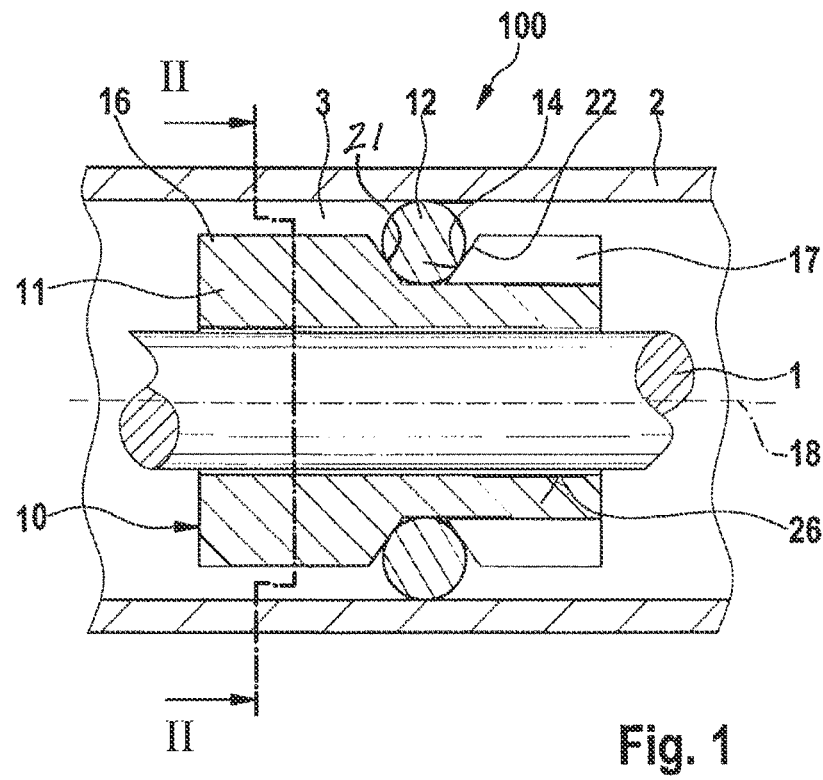
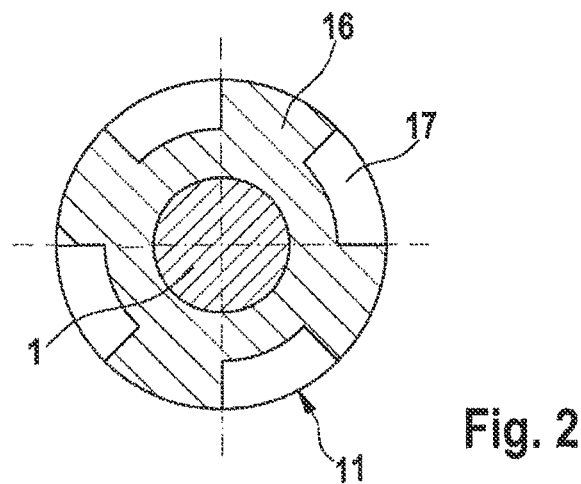
Fig. 1
Fig. 2

SLIDING BEARING, PROCESS FOR PRODUCING A SLIDING BEARING AND USE OF A SLIDING BEARING

BACKGROUND OF THE INVENTION

The invention relates to a sliding bearing. The invention also relates to a process for producing a sliding bearing and to the use of a sliding bearing.

For cost reasons, sintered bearings are usually employed in relatively small electric motors as are used, for example, as a comfort drive in motor vehicles as a seat adjustment drive or as a power-window drive. These bearings are produced by axial pressing of the material. However, radial undercuts (radial grooves) cannot be produced by this production process. Such sintered bearings are embodied as spherical or cylindrical sliding bearings. Here, in the case of spherical sliding bearings, the self-alignment of the bearing with respect to a housing is decisively influenced by the frictional engagement of additional components, resulting in a relatively high degree of scatter under similar conditions. Furthermore, the additional components (spring plates) in combination with the assembly and testing steps make the known spherical sliding bearings relatively expensive to produce. In the case of cylindrical sliding bearings, no self-alignment takes place at all, with the result that there is a relatively high risk of service life-reducing, so-called edge running. Furthermore, when the cylindrical sliding bearing is pressed in a force-fitting manner into a housing, the tolerances and cylinder shape defects of the housing are transferred to the bearing bore. Moreover, as a result of additional effects caused by different thermal expansions between the housing, the bearing and the shaft, a relatively large bearing play is required. This can result in undamped contact between the bearing and the housing, promoting the transmission of structure-borne noise. As seen overall, conventional bearings therefore have some negative properties which can only be avoided through a relatively high outlay on manufacturing, with correspondingly associated relatively high production costs.

SUMMARY OF THE INVENTION

Taking the illustrated prior art as a starting point, the object of the invention is to develop a sliding bearing such that, with relatively low production costs, it particularly allows an arrangement in a housing in which the transmission of structure-borne noise is avoided and tolerances between the bearing and the housing can be compensated for in a relatively simple manner. Here, the invention is based on the idea of forming the sliding bearing substantially only from two parts, namely the bearing body for receiving the shaft, and an elastic bearing element which is received on an outer lateral surface of the bearing body in a receptacle and produces contact with respect to the housing. Here, the elastic design of the bearing element achieves a constantly secure and noise-damping bearing of the sliding bearing against the housing, it being possible at the same time for component tolerances to be compensated for in a relatively simple and effective manner through the elasticity of the bearing element.

Advantageous developments of the sliding bearing according to the invention are specified in the subclaims. The scope encompasses all combinations of at least two features disclosed in the claims, the description and/or the figures.

With particular preference it is provided that the receptacle is designed as a radially encircling, groove-shaped receptacle. In a further embodiment of the invention, this means that the elastic bearing element can be designed as a standardized component, in particular as an O-ring or square ring. Consequently, the production costs of the sliding bearing can be reduced and high degrees of accuracy are achieved by means of the standardized component.

In one structural design of the sliding bearing in which the latter can be produced in a relatively simple manner by axial pressing, it is provided that the lateral surface has, in the longitudinal direction of the bearing body and on both sides of the receptacle, respective guide ribs which form the receptacle by way of mutually facing bevels, wherein the guide ribs arranged on both sides of the receptacle have an angle-of-rotation offset with respect to one another.

The bearing body of the sliding bearing can be produced with a wide variety of materials suitable for axial pressing. Provision can be made here in particular for the bearing body to consist of sintered metal, graphite, (which has naturally good lubricating properties), ceramic, plastic (here both thermosets and thermoplastics) or hard metal.

The invention also comprises a process for producing a sliding bearing according to the invention. Provision is made here for the bearing body to be produced by axial pressing by means of a tool, wherein, in order to form the guide bore (for the shaft), a first part of the tool is designed as a cylindrical mandrel toward which parts designed as a bottom die and as a top die are moved from two different directions of the longitudinal axis of the mandrel in order, by means of pressure, to form the material situated between the parts into the bearing body.

In a particularly preferred variant, it is proposed here that the parts of the tool serving as the bottom die and top die have a crown-like design.

To form the receptacle of the elastic bearing element, it is proposed here that tooth-like projections of the crown-like bottom die and top die are moved toward one another to form the receptacle, wherein the projections engage in one another over part of their length.

Particular preference is given to the use of a sliding bearing according to the invention for mounting shafts in small electric motors. Here, such small motors can be provided in particular in motor vehicle comfort drives, in particular as power-window drives or seat adjustment drives.

BRIEF DESCRIPTION OF THE DRAWINGS

Further advantages, features and details of the invention will become apparent from the following description of preferred exemplary embodiments and with reference to the drawing, in which:

FIG. 1 shows a longitudinal section through part of a drive motor using a sliding bearing according to the invention, FIG. 2 shows a view in direction II-II of FIG. 1.

DETAILED DESCRIPTION

Figure 3:
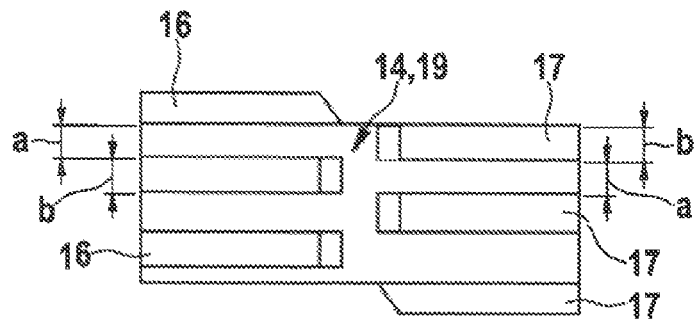
FIG. 3 shows a side view of a bearing body of a sliding bearing according to the invention.

In FIG. 1 there is shown, in a detail view, a region of a small electric motor 100 in the region where its shaft 1 is mounted. Here, the small motor 100 is in particular, but with no restriction being implied, a constituent part of a motor vehicle comfort drive, for example a power-window drive, a seat adjustment drive or the like.

The small motor 100 or the motor vehicle comfort drive has a housing 2 in the interior of which the shaft 1 is positioned or mounted by means of a sliding bearing 10 according to the invention. The sliding bearing 10 has a bearing body 11 which is positioned and received in the housing 2 via an elastic bearing element 12. Here, the bearing element 12 is designed in particular as a standardized component in the form of an O-ring or square ring which is received in a form-fitting manner in a radially encircling, groove-like receptacle 14 of the bearing body 11, wherein a radial gap 3 is additionally formed between the bearing body 11 and the housing 2 to compensate for component tolerances and to avoid the transmission of structure-borne noise to the housing 2.

As can be seen in particular by looking at FIGS. 1 to 3 together, the sleeve-shaped bearing body 11 has on its outer circumference guide ribs 16, 17 which are arranged in the longitudinal direction of the bearing body 11, i.e. axially parallel to the longitudinal axis 18 of the bearing body 11. Here, the guide ribs 16, 17 are arranged on both sides of the receptacle 14 in such a way that the guide ribs 16 forming one set each have an angle-of-rotation offset with respect to the guide ribs 17 forming the other set, wherein the distance a between the individual guide ribs 16, 17 is in each case identical and corresponds to the width b of a guide rib 16, 17 (FIG. 3). It can also be seen that the receptacle 14 in each case extends as far as the base 19 of the guide ribs 16, 17, and the guide ribs 16, 17 have bevels 21, 22 against which the bearing element 12 comes to bear.

The bearing body 11 is produced by a noncutting forming process in the form of axial pressing. Here, the bearing body 11 consists in particular of sintered metal, graphite, ceramic, plastic or hard metal.

Figure 4:
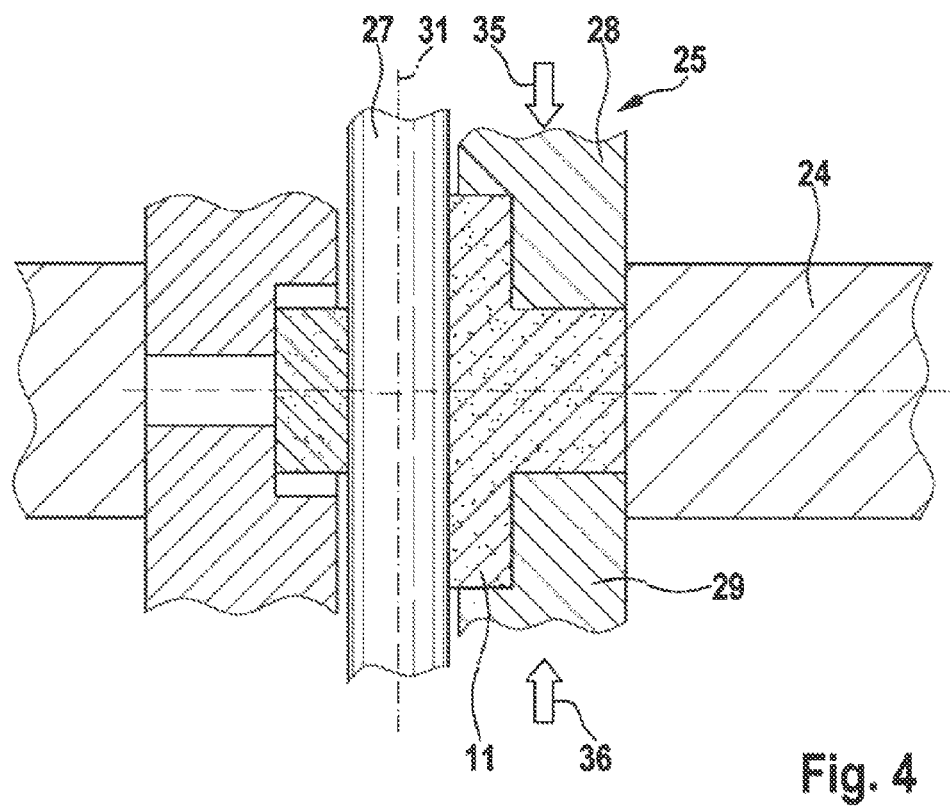
FIG. 4 shows a section through a tool for producing a sliding bearing according to the invention.
Figure 5:
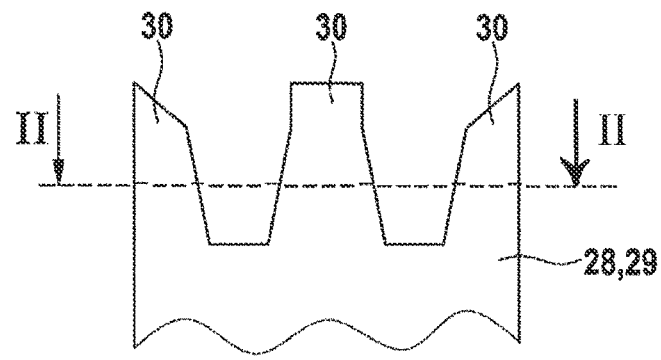
FIG. 5 shows a top and bottom die of a tool according to FIG. 4 in a simplified side view.
Figure 6:
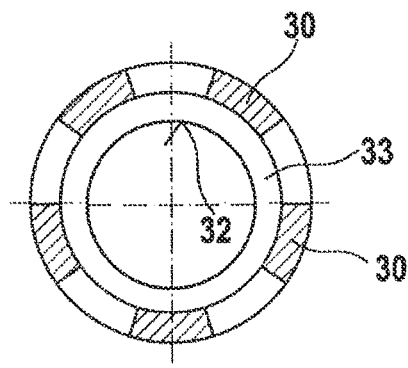
FIG. 6 shows a view in direction VI-VI of FIG. 5, an FIG. 7 shows a representation to illustrate the interaction between the top die and bottom die to form a receptacle for a bearing element.
Figure 7:
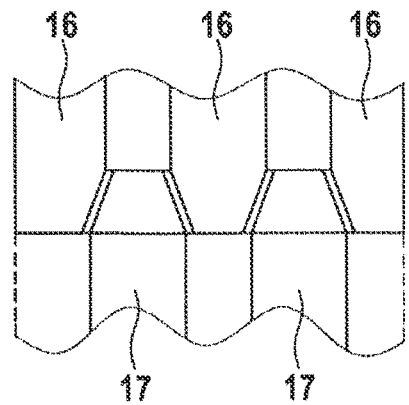

The production process for a bearing body 11 will now be described in greater detail with reference to FIGS. 4 to 7: FIG. 4 depicts in a simplified manner a tool 25 for producing the bearing body 11, the tool substantially comprising four parts: a cylindrical mandrel 27 arranged in the region of the guide bore 26 of the bearing body 11 or forming the guide bore 26, a top die 28, a bottom die 29 and a receiving body 24 which radially encloses the top die 28 and the bottom die 29. As can be seen in particular from FIGS. 5 and 6, both the top die 28 and the bottom die 29 each have a crown-like design. Here, the top die 28 and the bottom die 29 each have tooth-like projections 30 which serve to form the guide ribs 16, 17 and to form the receptacle 14. Furthermore, concentrically to the longitudinal axis 31 of the top die 28 and of the bottom die 29, a respective aperture 32 is formed at the bottom 33 of the top die 28 and of the bottom die 29 and is dimensioned such that the diameter of the aperture 32 is tailored to the diameter of the mandrel 27. As can also be seen from FIG. 4, the top die 28 and the bottom die 29 are moved toward one another in the direction of the arrows 35, 36 by means of drives (not shown) in order to produce the bearing body 11, with the mandrel 27 protruding through the two apertures 32 of the top die 28 and the bottom die 29. Furthermore, it can be seen from FIG. 7 that the angle-of-rotation position between the top die 28 and the bottom die 29 is such that, during the movement of the top die 28 and bottom die 29 toward one another, the tooth-like projections 30 project into one another over a part of their length, with the regions of the projections 30 which project into one another forming the receptacle 14 when the top die 28 and bottom die 29 are subsequently moved apart.

To form the bearing body 11, the material of the bearing body 11 is pressed between the top die 28, the bottom die 29 and the mandrel 27 by axially moving the top die 28 and bottom die 29 toward one another. The manufactured bearing body 11 can be removed from the tool 25 by withdrawing the mandrel 27 and then axially moving apart the top die 28 and bottom die 29.

The sliding bearing 10 described so far can be varied or modified in a variety of ways without departing from the idea of the invention. In particular, the bearing body 11 may also have different geometries. It is essential only that the bearing body 11 is produced by axial pressing, with a receptacle 14 for receiving an elastic bearing element 12 being formed during axial pressing.

The invention claimed is:

1. A sliding bearing (10) comprising a bearing body (11) which receives a shaft (1) in a guide bore (26), wherein the bearing body (11) is housed in a fixed element (2), wherein the bearing body (11) is provided on its outer circumference with a receptacle (14) in which is received an elastic bearing element (12) bearing against the fixed element (2), wherein the receptacle has opposite sides spaced in a longitudinal direction of the bearing body, wherein guide ribs (16, 17) are arranged on both sides of the receptacle (14) on the outer circumference of the bearing body (11) and extend in the longitudinal direction of the bearing body (11) and form the receptacle (14) by way of mutually facing bevels (21, 22), and wherein the guide ribs (16) on one side of the receptacle (14) are angularly offset with respect to the guide ribs (17) on the other side of the receptacle.

2. The sliding bearing according to claim 1, characterized in that the receptacle (14) is a radially encircling, groove-shaped receptacle (14).

3. The sliding bearing according to claim 1, characterized in that the elastic bearing element (12) is a standardized component.

4. The sliding bearing according to claim 1, characterized in that the bearing body (11) consists of sintered metal, graphite, ceramic, plastic or hard metal.

5. A process for mounting shafts (1) in small electric motors (100), the process comprising using a sliding bearing (10) according to claim 1.

6. The process according to claim 5, comprising using the sliding bearing (10) in motor vehicle comfort drives.

7. The process according to claim 6, comprising using the sliding bearing (10) in power-window drives or seat adjustment drives.

8. The sliding bearing according to claim 1, characterized in that the fixed element is a housing.

9. The sliding bearing according to claim 1, characterized in that the elastic bearing element (12) is an O-ring or square ring.

10. The sliding bearing according to claim 1 wherein a distance in a circumferential direction between individual guide ribs is identical to a width in a circumferential direction of each guide rib.

11. The sliding bearing according to claim 10 wherein the bearing body has opposite ends spaced in the longitudinal direction, wherein the guide ribs on one side of the receptacle extend from one end of the bearing body to the receptacle, and wherein the guide ribs on the other side of the receptacle extend from the other end of the bearing body to the receptacle.

12. The sliding bearing according to claim 1 wherein the bearing body has opposite ends spaced in the longitudinal direction, wherein the guide ribs on one side of the receptacle extend from one end of the bearing body to the receptacle, and wherein the guide ribs on the other side of the receptacle extend from the other end of the bearing body to the receptacle.

13. A process for producing a sliding bearing (10) comprising a bearing body (11) which receives a shaft (1) in a guide bore (26), wherein the bearing body (11) is housed in a fixed element (2), wherein the bearing body (11) is provided on its outer circumference with a receptacle (14) in which is received an elastic bearing element (12) bearing against the fixed element (2), wherein the receptacle has opposite sides spaced in a longitudinal direction of the bearing body, wherein guide ribs (16, 17) are arranged on both sides of the receptacle (14) on the outer circumference of the bearing body (11) and extend in the longitudinal direction of the bearing body (11) and form the receptacle (14) by way of mutually facing bevels (21, 22), and wherein the guide ribs (16, 17) on one side of the receptacle (14) have an angle-of-rotation offset with respect to the guide ribs on the other side of the receptacle, characterized in that the bearing body (11) is produced by axial pressing by a tool (25), the process comprising, in order to form the guide bore (26), providing a first part of the tool (25) as a cylindrical mandrel (27), and moving toward the mandrel, from two different directions of a longitudinal axis (31) of the mandrel (27), parts of the tool including a bottom die (29) and a top die (28) in order, by means of pressure, to form the material into the bearing body (11).

14. The process according to claim 13, characterized in that the parts of the tool (25) serving as a bottom die (29) and top die (28) have a crown-like design.

15. The process according to claim 14, characterized in that tooth-like projections (30) of the crown-like bottom die (29) and top die (28) are moved toward one another to form the receptacle (14), wherein the projections (30) engage in one another over part of their length.

16. A process for producing a sliding bearing (10) comprising a bearing body (11) which receives a shaft (1) in a guide bore (26), wherein the bearing body (11) is housed in a fixed element (2), wherein the bearing body (11) is provided on its outer circumference with a receptacle (14) in which is received an elastic bearing element (12) bearing against the fixed element (2), wherein the receptacle has opposite sides spaced in a longitudinal direction of the bearing body, wherein guide ribs (16, 17) are arranged on both sides of the receptacle (14) on the outer circumference of the bearing body (11) and extend in the longitudinal direction of the bearing body (11) and form the receptacle (14) by way of mutually facing bevels (21, 22), and wherein the guide ribs (16, 17) on one side of the receptacle (14) have an angle-of-rotation offset with respect to the guide ribs on the other side of the receptacle, the process comprising fabricating the bearing body (11) by a noncutting production process.

* * * * *